United States Patent [19]

Neubert

[11] Patent Number: 5,023,282

[45] Date of Patent: Jun. 11, 1991

[54] ASPHALT CONTAINING GILSONITE, REACTIVE OIL AND ELASTOMER

[75] Inventor: Terry C. Neubert, Kent, Ohio

[73] Assignee: GenCorp Inc., Fairlawn, Ohio

[21] Appl. No.: 439,126

[22] Filed: Nov. 17, 1989

[51] Int. Cl.$^5$ .......................... C08L 7/00; C08L 9/00; C08L 95/00; C08K 5/09

[52] U.S. Cl. .......................................... 524/59; 524/68; 524/70; 524/71; 525/54.5

[58] Field of Search ..................... 524/68, 70, 71, 59; 525/54.6

[56] References Cited

U.S. PATENT DOCUMENTS

| | | | |
|---|---|---|---|
| 2,069,314 | 2/1937 | Hunt et al. | 106/22 |
| 2,546,659 | 3/1951 | Sussenbach | 524/62 |
| 2,673,845 | 3/1954 | Stevens | 525/236 |
| 2,841,060 | 7/1958 | Coppage | 524/60 |
| 2,996,467 | 8/1961 | Hawley et al. | 524/62 |
| 3,010,926 | 11/1961 | Odasz, Jr. et al. | 524/60 |
| 3,041,299 | 6/1962 | Gzenski et al. | 524/62 |
| 3,048,494 | 8/1962 | Sawyer, Jr. | 106/278 |
| 3,635,863 | 1/1972 | Drukker | 524/59 |
| 3,763,074 | 10/1973 | Rostler | 106/280 |
| 3,778,397 | 12/1973 | Gannon et al. | 106/280 |
| 4,008,095 | 2/1977 | Fukushima et al. | 106/235 |
| 4,070,325 | 1/1978 | Burke | 106/277 |
| 4,133,932 | 1/1979 | Peck | 524/68 |
| 4,332,703 | 6/1982 | Lijzenga et al. | 524/68 |
| 4,433,084 | 2/1984 | Ostermeyer et al. | 524/62 |
| 4,459,157 | 7/1984 | Koons | 524/59 |
| 4,548,966 | 10/1985 | Moore | 524/71 |
| 4,621,108 | 11/1986 | Burris | 524/71 |
| 4,722,953 | 2/1988 | DeRuiter et al. | 524/71 |
| 4,755,545 | 7/1988 | Lalwani | 524/64 |

OTHER PUBLICATIONS

Abstract of Japanese Patent 59-193867 to Sawaguchi et al., 11/84.

Primary Examiner—Allan M. Lieberman

[57] ABSTRACT

Asphalt cement compositions are disclosed which utilize petroleum asphalt, natural asphalt, a reactive oil and an elastomer. These compositions produce a superior asphalt cement that can give low viscosity during application followed by high viscosity, toughness and tenacity after curing on the highway.

19 Claims, No Drawings

ASPHALT CONTAINING GILSONITE, REACTIVE OIL AND ELASTOMER

FIELD OF THE INVENTION

The present invention relates to asphalt cement compositions and more particularly to asphalt cement compositions comprising petroleum asphalt, natural asphalt, a reactive oil, and an elastomer. The asphalt cement composition is useful in a variety of applications including roofing and paving. The asphalt cement composition is particularly useful in preparing improved asphalt concrete compositions for paving compositions.

BACKGROUND

The term "asphalt cement," as used in the description of the present application refers to any of a variety of solid or semi-solid materials at room temperature which gradually liquify when heated and in which the predominant constituents are bitumens which are obtained as residue in petroleum refining. Asphalt is further defined by Kirk Othmer, *Encyclopedia of Chemical Technology*, Vol. 3, 3rd Ed. (1978), pages 284–327, John Wiley & Sons, New York. An additional discussion appears in the publication entitled "A Brief Introduction to Asphalt and Some of Its Uses," Manual Series No. 5 (MS-5), The Asphalt Institute 7th Edition, September 1974. Both of these references are hereby incorporated by reference.

Asphalt containing rubber has been evaluated in the past. Rubberized asphalt is too viscous for easy mixing and handling. Oil can be added to reduce the viscosity, but this yields an asphalt cement that tends to flow more than an asphalt cement without oil. This flow could result in "rutting" if such an asphalt cement were applied to a highway.

Asphalt cements have found particular utility when combined with aggregates. Such combinations generally are referred to as "asphalt concrete" and are employed extensively as paving compositions for roads, roofs, driveways, parking lots, airport runways, etc. The asphalt cement is converted to a fluid state when paving a road. One fluid form is a suspension or emulsion of the asphalt cement in water. After spreading or compressing the aggregate containing asphalts, water evaporates or separates and the asphalt hardens into a continuous mass. Another form of asphalt employed in road construction is a cutback, i.e. a liquid petroleum product produced by fluxing an asphaltic base with a suitable organic solvent or distillate. A road is formed by paving the aggregate containing cutback and evaporating the volatile distillate from the mass. An advantage of using the above road construction techniques is the avoidance of high temperature application. In an alternative and most widely used technique, the asphalt cement and aggregate can be mixed and applied at elevated temperatures at the fluid state of the asphalt cement to form the road.

U.S. Pat. No. 3,010,926 (Odasz, et al, Nov. 28, 1961), relates to asphaltic compositions and more particularly to compositions consisting essentially of asphalt having minor proportions of rubber interblended therewith or intimately dispersed therein, herein designated "rubberized asphalt." The reference provides such asphaltic compositions having novel and highly useful physical and chemical properties and also provides a commercially practical and economical method for producing such compositions and for regulating and controlling the properties thereof.

U.S. Pat. No. 4,621,108 (Burris, Nov. 4, 1986), relates to a base stock composition comprising a blend of gilsonite asphalt and a rubber latex residue. The base stock may be used alone as a paving material or emulsified to form a gilsonite emulsion having a variety of uses.

SUMMARY OF THE INVENTION

The present invention is directed to an asphalt cement composition formed from petroleum asphalt, natural asphalt, a reactive oil, and an elastomer. The elastomer has a gel content of up to about 95 percent by weight.

DETAILED DESCRIPTION OF THE INVENTION

It has been discovered that an asphalt cement can be toughened with gilsonite and thinned with a reactive oil. A reactive oil is an oil that contains a high content of unsaturated fatty acids. By using a reactive oil, the oil would cure or react after application of the asphalt cement to the highway, thereby allowing for a lower viscosity application by curing later to prevent "rutting."

The asphalts which can be modified in accordance with the invention include natural asphalts, petroleum asphalt, and petroleum tar. The latter two are generally known for roofing and paving compositions. The natural asphalt includes, for example, asphaltite, such as gilsonite, grahamite and glance pitch; lake asphalt such as trinidad asphalt; and rock asphalt. The petroleum asphalts include straight asphalt obtained by distillation of a crude oil (unblown and substantially unoxidized); blown asphalt produced by blowing an oxygen-containing gas into a straight asphalt in the presence or absence of a catalyst; solvent-extracted asphalt obtained when asphaltic material is separated from the petroleum fraction containing it by the use of propane or other solvents; and cutback asphalt, which is a mixture of straight asphalt and a light petroleum solvent. The petroleum tars that may be modified include oil gas tar obtained as a by-product when gases are produced from petroleum fractions; such tar in refined form; cutback tar obtained by mixing a light petroleum fraction with such tar; and tar pitch obtained as a residue by removing the volatile fraction from such tar. Any of these kinds of asphalt may be used individually or jointly. Straight asphalt is preferred for paving applications, and oxidized and blown asphalts are preferred for roofing applications. As used herein the term "asphalt cement" refers to any of a variety of substantially unblown or unoxidized solid or semi-solid materials at room temperature which gradually liquify when heated. Its predominant constituents are bitumens, which may be naturally occurring or obtained as the residue of refining processing. The asphalts cements are generally characterized by a penetration (PEN, measured in tenths of a milliliter, dmm) of less than 400 at 25° C., and a typical penetration is between 40 and 300 (ASTM Standard, Method D-5). The viscosity of asphalt cement at 60° C. is more than about 65 poise. Asphalt cements are often defined in terms specified by the American Association of State Highway Transportation Officials (AASHTO) AR Viscosity System. Two sets of typical specifications are as follows.

TABLE I

| TEST | AASHTO M - 226 | | | | | |
| --- | --- | --- | --- | --- | --- | --- |
| | AC 2.5 | AC 5 | AC 10 | AC 20 | AC 30 | AC 40 |
| Viscosity @ 140° F., poise (AASHTO T-202) | 250 ± 50 | 500 ± 100 | 1000 ± 200 | 2000 ± 400 | 3000 ± 600 | 4000 ± 800 |
| Viscosity @ 275° F., cSt, minimum (AASHTO T-201) | 125 | 175 | 250 | 300 | 350 | 400 |
| Pen. @ 77° F., minimum (AASHTO T-49) | 220 | 140 | 80 | 60 | 50 | 40 |
| Flash Point, COC minimum °F. | 325 | 350 | 425 | 450 | 450 | 450 |
| Ductility After TFOT (AASHTO T-179) @ 77° F., 5 CM/MIN, minimum | 100 | 100 | 75 | 50 | 40 | 25 |
| Viscosity After TFOT (AASHTO T-179) @ 140° F., poise minimum | 1000 | 2000 | 4000 | 8000 | 12000 | 16000 |

TABLE II

| TEST | AASHTO M-226 | | | | |
| --- | --- | --- | --- | --- | --- |
| | AR1000 | AR2000 | AR4000 | AR8000 | RT16000 |
| Viscosity @ 140° F., poise (AASHTO T-201) | 1000 ± 250 | 2000 ± 500 | 4000 ± 1000 | 8000 ± 2000 | 16000 ± 4000 |
| Viscosity @ 275° F., cSt, minimum (AASHTO T-201) | 140 | 200 | 275 | 400 | 500 |
| Pen. @ 77° F., minimum (AASHTO T-49) | 65 | 40 | 25 | 20 | 20 |
| Percent Of Original Pen. @ 77° F., minimum | — | 40 | 45 | 50 | 52 |
| Ductility @ 77° F., minimum, 5 cm/min | 100 | 100 | 75 | 75 | 75 |

The preferred natural asphalt is asphaltite such as gilsonite. Gilsonite is preferably one having a melting or softening point near about 300° F. so that it may be more easily softened and blended with the petroleum asphalt at such temperatures. One such gilsonite comprises a "selects" grade, having a nominal melting or softening point about 300° F., usually about 310°-320° F. However, other grades of gilsonite may be used including the "brilliant black" grade having a softening point of above about 385° F.

The reactive oil component is an oil such as vegetable or fish oil that contains a high content of unsaturated fatty acids. Oils are made up of both saturated and unsaturated fatty acids. The carbon-carbon unsaturation crosslinks or oxidizes especially in hot asphalt. Table III shows the component breakdown of several oils. Reactive oils having utility in this invention contain at least about 60 percent, generally at least about 80 percent, preferably at least about 85 percent and most preferably at least about 90 percent unsaturated fatty acid components and contain from about 14 to about 24 carbon atoms. Linseed oil, tall oil and tung oil all contain more than 90 percent unsaturated fatty acid components. Of these three oils, linseed oil is the most preferred.

TABLE III

| Fatty Acid Component | VEGETABLE OILS | | | | | | | | |
| --- | --- | --- | --- | --- | --- | --- | --- | --- | --- |
| | Corn[1] | Cottonseed[1] | Linseed | Peanut | Safflower[1] | Soybean[1] | Sunflower | Tall | Tung |
| Myristic | | 1.0 | | | .1 | .1 | | | |
| Palmitic | 11.5 | 25.0 | 5.5 | 11.0 | 6.7 | 10.5 | 7.0 | .2 | 4 |
| Cis-9-hexadecenoic[2] | | .7 | | | | | | | |
| Stearic | 2.2 | 2.8 | 3.5 | 2.3 | 2.7 | 3.2 | 3.3 | 2.2 | 1 |
| Oleic[2] | 26.6 | 17.1 | 19.1 | 51.0 | 12.9 | 22.3 | 14.3 | 59.3 | 8 |
| Linoleic[2] | 58.7 | 52.7 | 15.3 | 30.9 | 77.5 | 54.5 | 75.4 | 36.8 | 4 |
| Linolenic[2] | .8 | | 56.6 | | | 8.3 | | | 3 |
| α-eleostearic[2] | | | | | | | | | 80 |
| Eicosanoic | .2 | | | .7 | .5 | .2 | | .7 | |
| Cis-11-eicosenoic[2] | | | | | .5 | .9 | | .7 | |
| Docosanoic | | | | 2.3 | | | | | |
| Tetracosanoic | | | | .8 | | | | | |
| Unsaturated fatty acid content | 86.1 | 70.5 | 91.0 | 81.9 | 90.9 | 86.0 | 89.7 | 96.8 | 95.0 |

[1]Values derived from literature
[2]Unsaturated fatty acid

The elastomer component that has utility in this invention are those elastomers known in the art and literature. In effect, they are made from various elastomer forming monomers. One such class of monomers are the various conjugated dienes having from 4 to 12 carbon atoms. Specific examples of diene monomers include butadiene, isoprene, pentadiene, hexadiene, heptadiene, octadiene, 2,3-dimethyl-1,3-butadiene, 2-methyl-1,3- pentadiene, and the like. Also included within the class of conjugated dienes are the various copolymers and interpolymers thereof (e.g., polybutadiene-isoprene), including the various di-block copolymers, tri-block copolymers (e.g., polystyrenebutadiene-styrene), and the like. Preferred conjugated elastomers are made from monomers of butadiene and/or isoprene.

Moreover, natural rubber can be utilized. By the term "natural rubber," it is meant the elastomeric substance obtained from various trees and plants which generally grow in the tropics or desert portions of the world. Such material contains a very high content (in excess of 90 percent and often in excess of 95 percent) of cis-1,4-polyisoprene.

Another group of useful elastomers includes the various copolymers made from monomers of conjugated dienes having from 4 to 12 carbon atoms as set forth above and vinyl substituted aromatic compounds containing from 8 to 15 carbon atoms. Examples of specific vinyl substituted aromatic compounds include styrene, alphamethylstyrene, 4-t-butylstyrene, vinyl toluene, divinyl benzene, isopropenyl benzene, diisopropenyl benzene, and the like. Examples of specific copolymers thus include styrene-butadiene (SBR), alpha-methylstyrene-butadiene, and 4-t-butylstyrene-butadiene. A preferred elastomer is one made from a copolymer of styrene and butadiene wherein the styrene:butadiene weight ratio is from about 1:5 to about 1:2, preferably from about 1:4 to about 1:2 and most preferably from about 1:4 to about 1:3.

about 15 to about 150, preferably from about 20 to about 120 and most preferably from about 70 to 100.

Generally the four components are mixed and blended in a mechanical shear blender such as a Ross or Eppenbach mixer at a temperature of from about 300°–500° F., preferably from about 325° to about 450° F., and most preferably from about 350° to about 400° F.

Independently from about 1 to about 10 parts, preferably from about 2 to about 8 parts and most preferably from about 2 to about 4 parts of natural asphalt, reactive oil and elastomer are employed for every 100 parts of petroleum asphalt on a weight basis.

To further illustrate the present invention, the following specific examples are given, it being understood this is merely intended in an illustrative and not a limitative sense. In the examples, all parts and percentages are by weight unless otherwise noted.

In the following table of examples, gilsonite, linseed oil and an elastomer are blended with petroleum asphalt based upon 100 parts of petroleum asphalt. In these examples, the gilsonite, linseed oil and elastomer are added to the petroleum asphalt at 375° F. using a marine impeller and mixed for 6 hours at an agitation speed just fast enough for a reasonable turnover of the petroleum asphalt. The speed varied as the viscosity of the asphalt changed, but the turnover rate was kept similar in all examples. Disclosed within Table IV are the toughness, tenacity and elongation. Also measured are penetration and softening point on some of the examples.

TABLE IV

| ASPHALT CEMENT USING 100 PARTS AR-1000 ASPHALT | | | | | | | | |
|---|---|---|---|---|---|---|---|---|
| Example Number | Linseed Oil | Elastomer[1] | Gilsonite | Toughness Lbs. | Tenacity Lbs. | Elongation Inches | PEN | Softening Point |
| 1 | 0 | 0 | 0 | 25 | 8 | 4 | 122 | 42 |
| 2 | 5 | 5 | 5 | 35 | 24 | 15 | 162 | 45 |
| 3 | 5 | 5 | 1 | 21 | 15 | 11 | 500 | 41 |
| 4 | 1 | 5 | 5 | 89 | 45 | 20 | 95 | 49 |
| 5 | 5 | 1 | 5 | 25 | 12 | 7 | 176 | 40 |
| 6 | 1 | 5 | 1 | 47 | 30 | 18 | 119 | 48 |
| 7 | 5 | 1 | 1 | 14 | 8 | 8 | 600 | 37 |
| 8 | 1 | 1 | 5 | 47 | 14 | 8 | 87 | 45 |
| 9 | 3 | 3 | 3 | 27 | 18 | 7 | 136 | 43 |

[1] A styrene-butadiene elastomer containing about 21 percent weight styrene and 79 percent weight butadiene wherein the styrene:butadiene weight ratio is 1:3.76. Contains greater than 90 percent gel; $ML_4$ at 212° F., is too high to measure.

The elastomer component is further characterized by a gel content. Gel is the insoluble portion of the polymer and is generally thought to be crosslinked. The gel content of the elastomer can vary widely as from about 0 up to about 95 percent. Preferably the gel content is from about 0 to about 45 percent and most preferably from about 5 to about 25. When high gel elastomer is utilized, the blending time or mechanical shear blending time is longer than when a lower gel content elastomer is utilized.

Another distinguishing feature of the elastomer component is its molecular weight as measured by Mooney viscosity. The Mooney viscosity, $ML_4$ at 212° F. is from The toughness and tenacity are increased by either elastomer or gilsonite; however, the elastomer has the greatest effect on tenacity. The elongation, softness and penetration can be controlled to a larger extent by the level of reactive oil used.

Within Table V, Example 9 was repeated only an elastomer having 40 percent gel and $ML_4$ at 212° F. of 84 was substituted for the greater than 90 percent gel elastomer.

TABLE V

| ASPHALT CEMENT USING 100 PARTS AR-1000 ASPHALT | | | | | | |
|---|---|---|---|---|---|---|
| Example Number | Linseed Oil | Elastomer[1] | Gilsonite | Toughness lbs. | Tenacity lbs. | Elongation inches |
| 10 | 3 | 3 | 3 | 339 | 277 | 27 |

[1] A styrene-butadiene elastomer containing about 21% weight styrene and 79% weight butadiene wherein the styrene:butadiene weight ratio is 1:3.76.

In another embodiment of this invention, a two component system may be utilized in the formation of an asphalt cement. The two components are petroleum asphalt and an elastomer. Both components are as described above. Within the elastomer, the gel is low, that is, no greater than 10 percent. The advantage of using a low gel elastomer is that blending times are reduced.

While in accordance with the Patent Statutes, the best mode and preferred embodiment has been set forth, the scope of the invention is not limited thereto, but rather by the scope of the attached claims.

What is claimed is:

1. An asphalt composition consisting essentially of:
   100 parts by weight of a petroleum asphalt;
   from about 1 to about 10 parts by weight of a natural asphalt;
   from about 1 to about 10 parts by weight of a thinning reactive oil comprising at least about a 60 percent unsaturated fatty acid content having from about 14 to 24 carbon atoms, and
   from about 1 to about 10 parts by weight of an elastomer.

2. The composition of claim 1, wherein the petroleum asphalt is straight asphalt, blown asphalt, solvent extracted asphalt, or cutback asphalt.

3. The composition of claim 2, wherein the natural asphalt is asphaltite, lake asphalt, or rock asphalt.

4. The composition of claim 3, wherein the reactive oil is a vegetable oil.

5. The composition of claim 4, wherein the elastomer is made from conjugated diene monomer having from 4 to 12 carbon atoms, or wherein said elastomer is a copolymer or an interpolymer made from different conjugated diene monomers having from 4 to 12 carbon atoms, or a copolymer made from a conjugated diene having from 4 to 12 carbon atoms with a vinyl substituted aromatic having from 8 to 12 carbon atoms, or wherein said elastomer is an acrylic rubber, a natural rubber, a nitrile rubber, or polychloroprene.

6. The composition of claim 5, wherein the asphaltite is gilsonite, grahamite, or glance pitch.

7. The composition of claim 6, wherein the elastomer is a copolymer made from butadiene and styrene.

8. The composition of claim 7, wherein the asphaltite is gilsonite.

9. The composition of claim 8, wherein the elastomer has a Mooney viscosity, $ML_4$ at 212° F., of from about 15 to about 150.

10. The composition of claim 9, wherein the vegetable oils are corn, cotton seed, linseed, olive, peanut, safflower, sunflower, soybean, tall, or tung oils, or mixtures thereof.

11. The composition of claim 10, wherein the elastomer has a gel content of from about 0 up to about 95 percent.

12. The composition of claim 11, wherein the vegetable oil is linseed oil.

13. The composition of claim 12, wherein the elastomer has a gel content of from about 0 up to about 45 percent.

14. The composition of claim 13, wherein the elastomer has a gel content of from about 5 up to about 25 percent.

15. A cured asphalt composition consisting essentially of:
    100 parts by weight of a petroleum asphalt;
    from about 2 to about 8 parts by weight of a natural asphalt,
    from about 2 to about 8 parts by weight of a reacted oil comprising before reaction at least 60 percent by weight of an unsaturated fatty acid content having from about 14 to about 24 carbon atoms, and
    from about 2 to about 8 parts by weight of an elastomer.

16. The composition of claim 15, wherein the petroleum asphalt is straight asphalt, blown asphalt, solvent extracted asphalt, or cutback asphalt; wherein the natural asphalt is Gilsonite; wherein the reacted oil is linseed oil and the elastomer is a copolymer made from butadiene and styrene.

17. The composition of claim 16, wherein the elastomer has a Mooney viscosity, $ML_4$ at 212° F., of from about 20 to about 120.

18. The composition of claim 17, wherein the elastomer has a gel content of from about 0 up to about 45 percent.

19. The composition of claim 18, wherein the butadiene:styrene weight ratio is from about 1:4 to about 1:3.

* * * * *